US 10,063,572 B2

(12) United States Patent
Milazzo et al.

(10) Patent No.: US 10,063,572 B2
(45) Date of Patent: Aug. 28, 2018

(54) ANTIVIRUS SIGNATURE DISTRIBUTION WITH DISTRIBUTED LEDGER

(71) Applicant: Accenture Global Solutions Limited, Dublin (IE)

(72) Inventors: Andrea Maria Milazzo, Juan les Pins (FR); Luca Schiatti, Juan les Pins (FR); Giuseppe Giordano, Juan les Pins (FR); Emmanuel Viale, Cagnes sur Mer (FR)

(73) Assignee: Accenture Global Solutions Limited, Dublin (IE)

( * ) Notice: Subject to any disclaimer, the term of this patent is extended or adjusted under 35 U.S.C. 154(b) by 199 days.

(21) Appl. No.: 15/082,895

(22) Filed: Mar. 28, 2016

(65) Prior Publication Data
US 2017/0279818 A1    Sep. 28, 2017

(51) Int. Cl.
*G06F 21/56* (2013.01)
*H04L 29/06* (2006.01)

(52) U.S. Cl.
CPC ........ *H04L 63/1416* (2013.01); *G06F 21/564* (2013.01); *H04L 63/145* (2013.01); *H04L 63/1433* (2013.01)

(58) Field of Classification Search
CPC .......... G06F 21/00; G06F 21/50; G06F 21/56; G06F 21/561; G06F 21/564; H04L 63/00; H04L 63/14; H04L 63/1416; H04L 63/1441; H04L 63/145
See application file for complete search history.

(56) References Cited

U.S. PATENT DOCUMENTS

| 2004/0128355 | A1  | 7/2004  | Chao et al.   |
|--------------|-----|---------|---------------|
| 2006/0253578 | A1† | 11/2006 | Dixon et al.  |
| 2007/0038677 | A1  | 2/2007  | Reasor et al. |
| 2009/0007102 | A1† | 1/2009  | Dadhia et al. |
| 2010/0071054 | A1† | 3/2010  | Hart          |

(Continued)

OTHER PUBLICATIONS

Noyes, Charles "BitAV: Fast Anti-Malware by Distributed Blockchain Consensus and Feedforward Scanning" [Online], Jan. 2016 [Retrieved on Dec. 10, 2016], Cornell University Library Retrived from: < https://arxiv.org/pdf/1601.01405.pdf >.*

(Continued)

*Primary Examiner* — Eric W Shepperd
(74) *Attorney, Agent, or Firm* — Fish & Richardson P.C.

(57) ABSTRACT

This document generally describes techniques for using a distributed ledger to implement a framework for the validation and distribution of virus signatures, which may be used by antivirus engines on computing devices to detect and remove malware. Some implementations can include accessing, by a computing system, data that identifies a plurality of virus signatures. A signature score associated with a first virus signature can be identified that is determined based on a number of signature authorities that have submitted or endorsed the first virus signature. The computing system may determine whether the first virus signature is valid based on whether the signature score satisfies a threshold score. In response to determining that the first virus signature is valid, the first virus signature can be used by the computing system to perform virus scans of one or more files maintained by the computing system.

14 Claims, 7 Drawing Sheets

(56) References Cited

U.S. PATENT DOCUMENTS

| | | | | |
|---|---|---|---|---|
| 2015/0271289 | A1* | 9/2015 | Work | G06Q 10/00 709/204 |
| 2016/0027229 | A1* | 1/2016 | Spanos | G07C 13/00 705/51 |
| 2017/0034197 | A1* | 2/2017 | Daniel | H04L 63/1416 |
| 2017/0177898 | A1† | 6/2017 | Dillenberger | |

OTHER PUBLICATIONS

Peters et al. "Understanding Modern Banking Ledgers through Blockchain Technologies: Future of Transaction Processing and Smart Contracts on the Internet of Money" [Online], Nov. 19, 2015 [Retrieved on: Dec. 11, 2017], Retrieved from: < https://arxiv.org/pdf/1511.05740.pdf >.*

Australian Office Action for Application No. 2017201870, dated Sep. 14, 2017, 6 pages.

European Office Action in European Application No. 17160625.4, dated Oct. 9, 2017, 12 pages.

'Contracts and Transactions,' [online][Retrieved on Mar. 28, 2016]; Retrieved from the Internet URL: https://github.com/ethereum/go-ethereum/wiki/Contracts-and-Transactions, 14 pages.

'Description of Symmetric and Asymmetric Encryption,' [online][Retrieved on Mar. 28, 2016]; Retrieved from the Internet URL: https://support.microsoft.com/en-us/kb/246071, 3 pages.

'Public-key cryptography,' [online][Retrieved on Mar. 28, 2016]; Retrieved from the Internet URL: https://en.wikipedia.org/wiki/Public-key_cryptography, 16 pages.

'The Greeter,' [online][Retrieved on Mar. 28, 2010]; Retrieved from the Internet URL: https;//www.ethereum.org/greeter, 13 pages.

"A Next-Generation Smart Contract and Decentralized Application Platform," [online][Retrieved on Mar. 28, 2016]; Retrieved from the Internet URL: https://github.com/ethereum/wiki/wiki/White-Paper, 24 pages.

"Computer virus," [online][Retrieved on Mar. 28, 2016]; Retrieved from the Internet URL: https://en.wikipedia.org/wiki/Computer_virus, 15 pages.

"How do I update the virus signature files?," [online][Retrieved on Mar. 28, 2016]; Retrieved from the Internet URL: http://www.f-prot.com/support/unix/unix_faq/updating.html, 2 pages.

"HTG Explains: How Antivirus Software Works," [online][Retrieved on Mar. 28, 2016]; Retrieved from the Internet URL: http://www.howtogeek.com/125650/htg-explains-how-anti-virus-softward-works/, 5 pages.

"Managing accounts," [online][Retrieved on Mar. 28, 2016]; Retrieved from the Internet URL: https://github.com/ethereum/go-ethereum/wiki/Managing-your-accounts, 6 pages.

"What is a Virus Signature?," [online][Retrieved on Mar. 28, 2016]; Retrieved from the Internet URL: https://antivirus.about.com/od/whatisavirus/a/virussignature.htm, 4 pages.

Swan, Melanie, 'Blockchain,' O'Reilly Media, Inc., 2015, 149 pages.

Charles Noyes, "BitAV: Fast Anti-Malware by Distributed Blockchain Consensus and Feedforward Scanning," Jan. 7, 2016, [Retrieved on Jul. 17, 20017], Retrieved from the Internet; URL: https://arxiv.org/pdg/1601.01405.pdf> , 10 pages.

Yang et al., "Enhancing Mobile Malware Detection with Social Collaboration," Privacy, Security, Risk and Trust (PASSAT), Department of Computer Science, IEEE, Oct. 9, 2011, 5 pages.

European Search Report for Application No. 17160625, dated Jul. 20, 2017, 6 pages.

* cited by examiner
† cited by third party

ANTIVIRUS SIGNATURE DISTRIBUTION WITH DISTRIBUTED LEDGER

TECHNICAL FIELD

This document generally relates to improving computer security, and more particularly to techniques for efficiently vetting and distributing signatures and other updates to antivirus scanners on computing devices and systems.

BACKGROUND

Antivirus engines are commonly provided on computing devices to protect against risks of malware exploiting the devices to illegitimate ends. Some antivirus engines use virus signatures provided in virus definition files stored on a device in order to scan and identify files that are potentially malicious (e.g., a virus, worm, trojan, or other form of malware). In order to remain protected against the latest, constantly evolving threats, user devices may update their virus definition files on a regular basis to incorporate new virus signatures that are designed to detect newer malware. Once an item of malware has been detected on a device, the antivirus engine may take action to mitigate its threat, such as by quarantining or deleting the malware from the device.

SUMMARY

This document generally describes techniques for using a distributed ledger to implement a framework for the validation and distribution of virus signatures, which may be used by antivirus engines on computing devices to detect and remove malware. Security researchers and other signature authorities that develop virus signatures may submit new signatures to the distributed ledger, which can cause the signature to be made rapidly available to many users in a network. Other security researchers may test and validate new signatures, and may endorse signatures on the ledger that are deemed safe and effective. The distributed ledger, the antivirus engines on user devices, or both, may be configured to suppress use of new signatures until at least a threshold number of signature authorities have submitted or endorsed the signatures.

Some implementations of the subject matter described herein include a computer-implemented method. The method can include accessing, by a computing system, data that identifies a plurality of virus signatures, wherein at least some virus signatures among the plurality of virus signatures were submitted by different signature authorities. A signature score associated with a first virus signature can be identified from among the plurality of virus signatures, wherein the signature score is determined based on a number of signature authorities that have submitted or endorsed the first virus signature. The computing system may determine whether the first virus signature is valid based on whether the signature score that indicates the number of signature authorities that have submitted or endorsed the first virus signature satisfies a threshold score. In response to determining that the first virus signature is valid, the first virus signature can be used by the computing system to perform virus scans of one or more files maintained by the computing system.

Accessing the data that identifies the plurality of virus signatures can include accessing the data from an electronic ledger that stores records of virus signatures submitted by a plurality of signature authorities. Respective instances of the electronic ledger can be separately maintained by each of a plurality of nodes in a computing network.

The electronic ledger can be a distributed database having blockchain capabilities.

A first instance of the electronic ledger can be stored and maintained by the computing system. Other instances of the electronic ledger can respectively be stored and maintained by other computing systems that comprise nodes in the computing network. The computing system can receive transactions broadcasted over the computing network by at least some of the other computing systems, the transactions indicating at least one of new virus signatures that are submitted for distribution on the computing network or votes by signature authorities to endorse existing virus signatures that have been submitted for distribution on the computing network.

Records of the received transactions can be added to the first instance of the electronic ledger.

A particular computing system, among the at least some of the other computing systems, can be identified as the computing system that broadcasted a particular one of the transactions. A record of the particular one of the transactions can be added to the first instance of the electronic ledger in response to verifying the identity of the particular computing system.

A first subset of the plurality of nodes in the computing network that respectively correspond to different ones of a plurality of signature authorities can be assigned at least one of (i) permission to submit new virus signatures for distribution over the computing network by posting new signature transactions to the electronic ledger or (ii) permission to post voting transactions to the electronic ledger that indicate the validity of existing virus signatures that have been made available for distribution over the computing network. A second subset of the plurality of nodes in the computing network that respectively correspond to different ones of a plurality of consumer computing systems can be blocked from submitting new virus signatures for distribution over the computing network or posting voting transactions to the electronic ledger.

Determining whether the first virus signature is valid can include determining, based on the signature score, whether at least a threshold number of signature authorities have submitted the first virus signature or whether at least a threshold number of signature authorities have endorsed the first virus signature.

Each of a plurality of signature authorities can be assigned a respective weighting value, and the signature score can be determined further based on the respective weighting values assigned to signature authorities among the plurality of signature authorities that have submitted or endorsed the first virus signature, such that the submission or endorsement of the first virus signature by signature authorities that are assigned different respective weighting values causes adjustments to the signature score by different amounts.

The computing system can receive user input to change a first weighting value assigned to a first signature authority among the plurality of signature authorities, and in response, can change the first weighting value based on the user input.

The computing system can be configured to not use the first virus signature in virus scans of files maintained by the computing system until the signature score that indicates the number of signature authorities that have submitted or endorsed the first virus signature is determined to satisfy the threshold score.

The signature score can indicate a number of signature authorities that have independently submitted the first virus signature for distribution.

The signature score can indicate a number of signature authorities that have endorsed the first virus signature.

Some implementations of the subject matter described herein can include one or more non-transitory computer-readable media having instructions stored thereon that, when executed by one or more processors, cause performance of operations. The operations can include accessing, by a computing system, data that identifies a plurality of virus signatures, wherein at least some virus signatures among the plurality of virus signatures were submitted by different signature authorities; identifying a signature score associated with a first virus signature among the plurality of virus signatures, wherein the signature score is determined based on a number of signature authorities that have submitted or endorsed the first virus signature; determining whether the first virus signature is valid based on whether the signature score that indicates the number of signature authorities that have submitted or endorsed the first virus signature satisfies a threshold score; and in response to determining that the first virus signature is valid, using the first virus signature in virus scans of one or more files maintained by the computing system.

Some implementations of the subject matter described herein can include a computer-implemented method. The method can include accessing, by a computing system of a first signature authority, data that identifies a plurality of virus signatures. At least some virus signatures among the plurality of virus signatures can be submitted for distribution by different signature authorities. The computing system can identify, from the data, a first virus signature that a second signature authority has submitted for distribution. The computing system analyzes the first virus signature to determine an effectiveness of the first virus signature in detecting one or more viruses. In response to determining that the first virus signature is effective to detect one or more viruses, the computing system can generate an endorsement of the first virus signature for transmission to one or more other computing systems remote from the computing system.

These and other implementations can further include one or more of the following features. The data that identifies the plurality of virus signatures can include a blockchain database. Respective instances of the blockchain database can be stored and maintained by at least the one or more other computing systems remote from the computing system. The endorsement of the first virus signature can be transmitted so as to cause the respective instances of the blockchain database to be updated to record an indication of the endorsement.

In some implementations, the techniques described herein may realize, in certain instances, one or more of the following advantages. First, new virus signatures may be distributed quickly and efficiently to end user devices from signature authorities that develop and issue new signatures to address evolving malware threats. Efficiently updating signatures on a device can be an important aspect of an antivirus engine's ability to effectively detect and remove malware, and particularly to address newer forms of malware that may not be detectable using older signatures. The distributed ledger approach described herein may allow new signatures to be automatically distributed to many user devices in a short period of time (e.g., 1-10 seconds, 1-5 minutes) over a large geographic area. Additionally, in some implementations, the techniques described herein may provide an efficient voting mechanism that allows new virus signatures to be quickly vetted (e.g., undergo a "peer review") and endorsed or rejected by multiple independent security centers that are associated with the distributed ledger. As additional security centers verify the effectiveness of newly submitted virus signatures, they may endorse (e.g., vote for) the signature to lend credibility to the signature, thereby increasing a score associated with the signature. User devices may then use the score to determine when to update their virus definitions with a signature from the ledger. Moreover, the voting mechanism may reduce latency between the time a new virus signature has been validated on the ledger and the time that it is usable by end user devices.

DESCRIPTION OF DRAWINGS

Like references and indicators among the drawings indicate like elements.

DETAILED DESCRIPTION

Figure 1A:
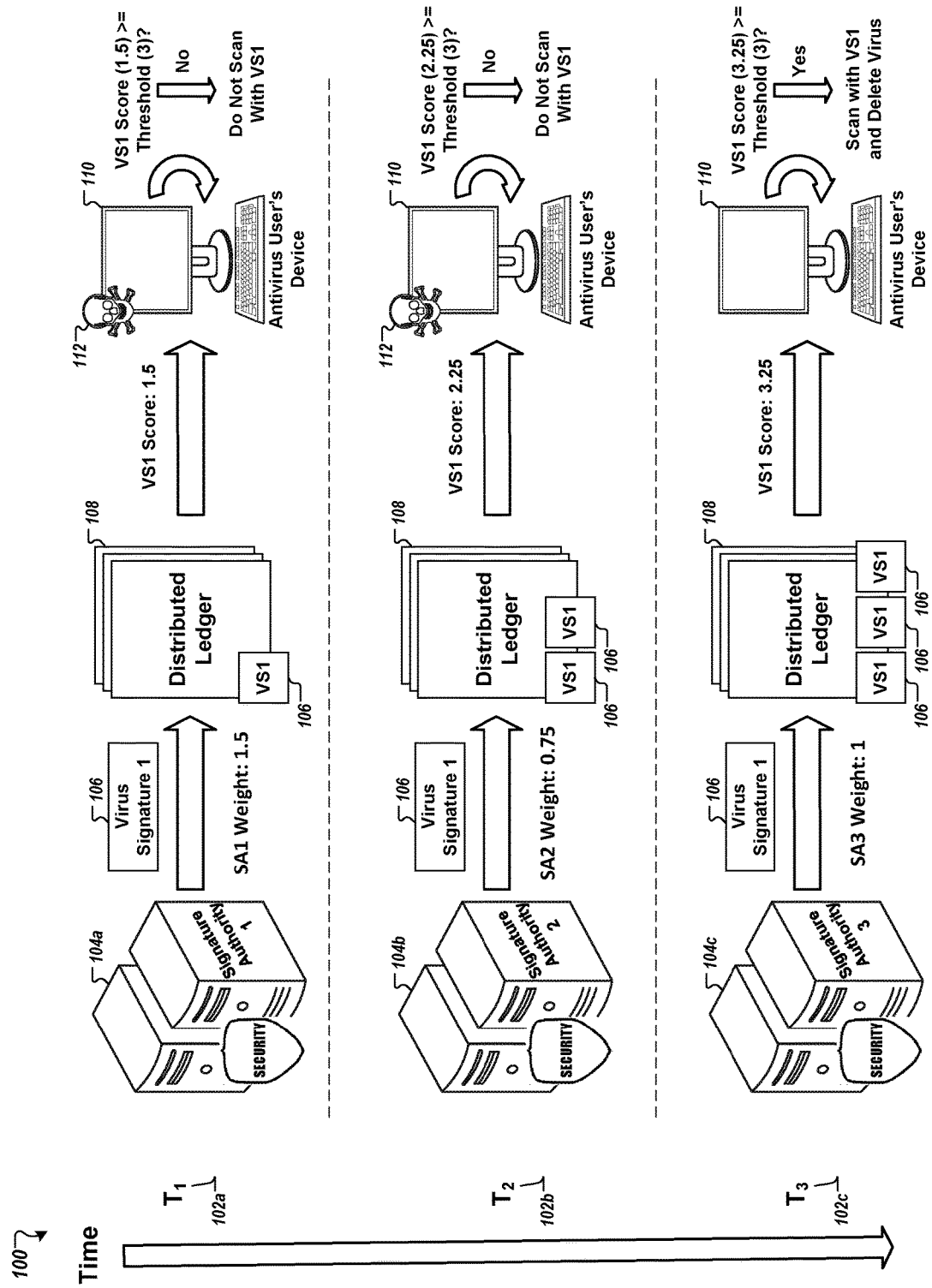
FIG. 1A is a conceptual diagram of an example process for distributing a new virus signature to user devices via a distributed ledger. The time at which the new signature is released for use by the user devices can be determined based on a number of signature authorities that submitted the signature to the ledger.

This document generally describes systems, methods, devices and other techniques for efficiently validating and deploying code for detecting the presence of malware on computing devices. To protect against risks of security breaches and malware exploitation, many computing devices are equipped with antivirus software capable of detecting malware, preventing malware from being executed or otherwise inflicting harm on the device, alerting users when malware has been detected, automatically removing malware, or performing a combination of such operations. In some cases, antivirus software on a given device uses antivirus signatures for the detection of malicious code. For example, the antivirus software may perform background scans on programs, documents and other files stored on a device to determine whether any of the files match at least one virus signature provided by a trusted signature authority (e.g., the vendor of the antivirus software). When a match is determined, the matching file may be classified as malware and appropriate remedial action taken, such as quarantining or removing the file from the computing device. A virus signature thus serves as a "fingerprint" that uniquely identifies one or more pieces of malware on a device.

One challenge faced by antivirus developers is the evolving nature of computer-based security threats. New forms of malware are constantly being developed and introduced to users' devices. Antivirus developers thus aim to identify new malware, generate signatures for the new malware, and deploy the signatures to users' devices efficiently. In turn, the end users whose devices rely on antivirus software to protect against malware are responsible for obtaining newly released antivirus signatures and updating virus definition files stored on the devices that are used by the software to scan files. To ensure that the devices are protected against the latest malware threats, users are encouraged to frequently update their virus definition files. Not all users, however, update their virus definitions with sufficient frequency, thereby leaving their computers susceptible to newer threats. Moreover, users generally must trust that new antivirus signatures distributed from a particular source (e.g., an organization associated with the user's antivirus software) will be effective to combat the virus and effective at not generating false positives (e.g., minimize likelihood that benign files will be mistakenly classified as malware). Users also rely on antivirus signatures being developed and distributed before a given virus has infected the users' machines for proactive protection.

Accordingly, the techniques described herein can, in some implementations, enable the efficient validation and deployment of code for detecting the presence of malware on computing devices (e.g., antivirus signatures). In some implementations, each of a plurality of signature authorities (e.g., businesses, research centers, consultants, organizations, or other entities that develop, test, and issue antivirus signatures) may be granted privileges to submit new antivirus signatures to a common database. The database may be accessible to user devices (e.g., consumers' computing devices) that run antivirus software compatible with the types of antivirus signatures or other malware detection code stored in or referenced by the database. In some implementations, the database may be provided in the form of a distributed ledger, in which respective instances of the ledger are stored and maintained locally by a network of computers operated by entities that are independent from each other. Thus, the distributed ledger may not be stored in a centralized manner, but rather full copies of the ledger may be distributed across many nodes in the computer network. Cryptographic functions and certain protocols may allow the computer nodes to communicate with each other and to coordinate updates to the ledger at each node. In some implementations, the distributed ledger may comprise a blockchain.

Within such framework, individual signature authorities may submit new virus signatures that have been discovered to the database. In some cases, multiple different signature authorities may each independently discover or generate the same virus signature for a given virus, and each of these signature authorities may separately submit the signature to the database upon its discovery or generation. As a general matter, the more signature authorities that have submitted a given virus signature to the database reflects a greater confidence in the signature's validity or effectiveness. The antivirus software on the consumers' computers may be programmed to wait until at least a threshold number of signature authorities have submitted a virus signature before using the signature to scan files on the consumers' computers. This increases the likelihood that a new antivirus signature will be safe and effective for consumers to use.

In some implementations, after a first signature authority has submitted a new signature to the database, other signature authorities can evaluate the signature to assess its safety and effectiveness. The other signature authorities can then endorse the new signature submitted by the first signature authority if the new signature is verified to be safe and effective. The antivirus software on the consumers' computers may be programmed to wait until at least a threshold number of signature authorities have endorsed a given virus signature before using the signature to scan files on the consumers' computers. In some implementations, the decision of whether to use a newly submitted virus signature on a consumer's computer can be based on a score associated with the virus signature, where the score is based on a combination of factors such as the number of signature authorities that have submitted the signature, the number of signature authorities that have endorsed the signature, and/or respective measures of trust (weights) associated with each of the signature authorities that submitted or endorsed the new signature.

As used in this document, the term "virus" is intended to encompass all forms of computer malware that are capable of detection using antivirus software, and the term "antivirus signature" is intended to encompass both binary signatures for scanning files before they are executed and runtime signatures that indicate heuristics (e.g., known behaviors such as system calls and conditions) of malware that are detected when an infected file is executed. For example, the term "virus" may include more than just "viruses" per se in the strict sense of the word; rather, a "virus" may further include adware, rootkits, trojan horses, worms, ransomware, keyloggers, and more, and antivirus signatures may be developed that are capable of uniquely identifying any of these.

Turning to FIG. 1A, a conceptual diagram is shown of an example process 100 for distributing a new virus signature 106 to user devices 110 via a distributed ledger 108. The user devices 110 are configured to accept and use the signature 106 based at least in part on a number of signature authorities 104a-c that have submitted the signature 106 to the ledger 108. Before the signature 106 has been submitted by different signature authorities 104a-c at least a threshold number of times, however, the user device 110 selects not to use the new signature 106. This process 300 is illustrated in FIG. 1A, by way of example, at stages occurring at three periods of times $T_1$-$T_3$ (102a-c).

At the stage occurring during time period $T_1$ (102a), a first signature authority 104a submits a new virus signature 106 to a distributed ledger 108. The first signature authority 104a may be a security research center or other entity that develops and tests signatures for antivirus engines, for example. The virus signature 106 may be capable of detecting one or more pieces of malware 112 that have infected a client device 110. As shown, the first signature authority 104a is the first authority to have submitted the virus signature 106 to the ledger 108. The first signature authority 104a may seek to release the virus signature 106 as quickly as possible once the signature 106 has been determined and tested. However, because the signature 106 may not have yet been verified by other signature authorities to ensure that it can be safely used and is effective at detecting the targeted malware, an antivirus engine at the user's device may be configured to not use the virus signature 106 until a score assigned to the new signature 106 satisfies a threshold score.

In some implementations, the score 106 can be based in whole or in part on a number of signature authorities have independently submitted the signature 106 to the ledger 108. Before the threshold score is satisfied, the user's device 110 may be prevented from using a new signature recorded on the ledger 108 as a result of restrictions imposed by the device's own antivirus engine, by the ledger 108, or both. For example, as shown in FIG. 1A, the threshold score is set to 3, but when the first signature authority 104a initially submits the new virus signature 106 to the ledger 108, the signature 106 is not accepted on the device 110 for use because the initial score for the signature 106 is only 1.5.

In some implementations, a respective trust value may be assigned to each of the signature authorities that have privileges to submit or endorse new virus signatures to the ledger 108. The trust value may be used to weight a given signature authority's contribution to a virus signature score when the signature authority performs an action related to the signature (e.g., submits or endorses the signature). For example, the baseline trust value may be "1.0" for average the signature authorities. More trusted authorities may be assigned values above the average, and less trusted authorities may be assigned values below the average. The first signature authority 104a has a trust value of 1.5, indicating that it is a highly trusted entity. Accordingly, the initial submission of the virus signature 106 by the first signature authority 104a serves to make the initial score for the virus signature 106 1.5. As further actions by other signature authorities are recorded in the ledger 108, the score may be increased in a cumulative fashion, such as by adding the trust value associated with the appropriate signature authority to the latest score.

The trust values associated with the signature authorities 104a-c may be assigned according to various techniques. In some implementations, the values are assigned by one or more nodes in the distribution network that have rights to assign trust values to other nodes in the ledger. For example, when a first node that has the right to assign trust values to other nodes desires to change or assign a trust score to a second node in the network, the first node can broadcast a transaction over the network that indicates a request to change or assign the second node's trust score. The transaction may be implemented as a smart contract in some examples. The transaction may then require approval by at least a threshold number of portion of nodes in the network that have been granted rights to approve changes or assignments of trust scores. In some implementations, rights assigned to nodes in the network (e.g., rights to assign trust scores, rights to vote on particular types of transactions, rights to submit virus signatures, and/or rights to endorse virus signatures) can be defined in a genesis block of a blockchain-based distributed ledger network by a creator of the blockchain. The genesis block may indicate an initial set of nodes that have particular rights, and those nodes may successively assign rights to other nodes according to criteria defined in the genesis block.

In some implementations, such as if the network is not a blockchain-based network, the trust values may be assigned by a system administrator, and these values are made to apply for all users on an antivirus signature distribution network. In some implementations, the values may be automatically assigned based on one or more criteria. The criteria may include, for example, ratings and reviews of a signature authority's past virus signature submissions; ratings and reviews of a signature authority's past virus signature endorsements; the quantity of signatures submitted or endorsed by a signature authority over a past period of time; the size of the signature authority; the length of time the signature authority has been a member of the distribution network; or a combination of any two or more of these.

At the stage occurring during a later time period $T_2$ (102b), a second signature authority 104b makes a second submission of the virus signature 106 to the distributed ledger 108. In some implementations, the second signature authority 104b is an entity that is independent of the first signature authority 104a or of other signature authorities participating in the distribution network. For example, the first signature authority 104a may be a security research center based in France, while the second signature authority 104b may an antivirus consulting company based in the United States. Other than generally working in a common field and being participants in a common distribution network via the distributed ledger 108, the first and second signature authorities 104a,b may be otherwise unrelated to each other.

Alternatively, some or all of the signature authorities that participate in the distribution network may be related to each other, such as representing different divisions (e.g., sub-organizations) within a larger, parent organization (e.g., business). For example, antivirus signature development teams may be deployed to determine a signature for a newly discovered virus. Each of the teams may then independently generate a signature and submit the signature to the ledger 108. This can give the parent organization greater confidence that the signatures it distributes over the network will be safe and effective, because user devices 110 may be blocked from using the signature until it has been submitted by multiple divisions of the parent organization.

As shown in the figure, the second signature authority 104b has been assigned a trust value of 0.75, indicating that it is comparatively a less trusted authority than the first signature authority 104a. Accordingly, the impact of the second signature authority's 104b submission of the antivirus signature 106 on the signature's score 106 is about half of the impact from the first signature authority's 104a submission. As a result of the second signature authority's 104b submission, a second occurrence of the virus signature 106 is recorded in the distributed ledger 108. In some implementations, the virus signature 106 may be stored directly in the ledger 108. In some implementations, the binary for the virus signature 106 may be stored at a location off the ledger 108, but a pointer or other reference to the location where the signature 106 is stored may be recorded in the ledger. In some implementations, the virus signatures 106 determined by both the first and second signature authorities 104a,b may be identical. Accordingly, after the first signature authority 104a makes the initial submission of the signature 106, subsequent submissions of the signature 106 (e.g., by the second signature authority 104b) may be stored on the ledger 108, or the ledger 108 may simply record that additional occurrences of the signature 106 have been submitted without directly storing additional copies of the signature 106 for each subsequent submission. The second submission of the signature 106 is represented in FIG. 1A by the second representation of the signature 106 on the ledger 108.

After the second signature authority 104b has made the second submission of the signature 106, the antivirus engine on the user's device 110 checks for any available updates in the ledger 106. The device 110 may identify that a second submission of the signature 106 has been made, but the updated score for the signature 106 (2.25) still does not satisfy the threshold score required for the device 110 to use the signature 106 in virus scans. In some implementations, the updated score may be determined by adding the trust value associated with the second signature authority 104b (0.75) to the pending score (1.25).

Next, at the stage occurring during a later time period $T_3$ (102c), a third signature authority 104c makes a third submission of the virus signature 106 to the distributed ledger 108. The third signature authority 104c may be a separate and independent entity from the first and second signature authorities 104a,b, or may be a separate but related entity to either or both of the signature authorities 104a,b (e.g., related through a parent organization as previously described). For example, the third signature authority 104c may have independently identified the virus 112 that has infected the user's device 110, and independently developed and tested the virus signature 106. The third signature authority 104c has been assigned a trust value of 1, and thus the contribution of the third signature authority's 104c submission of virus signature 106 is weighted less than the first signature authority 104a but more than the second signature authority's 104b. The third signature authority's 104c trust value is added to the pending score, such that the resulting score after the time period $T_3$ is 3.25. When the user's device 110 checks the ledger 108 for updates, the device 110 determines that the updated score (3.25) now satisfies the threshold score (3). As such, the user's device 110 can begin to use the signature 106 in virus scans on the device 110.

Figure 1B:
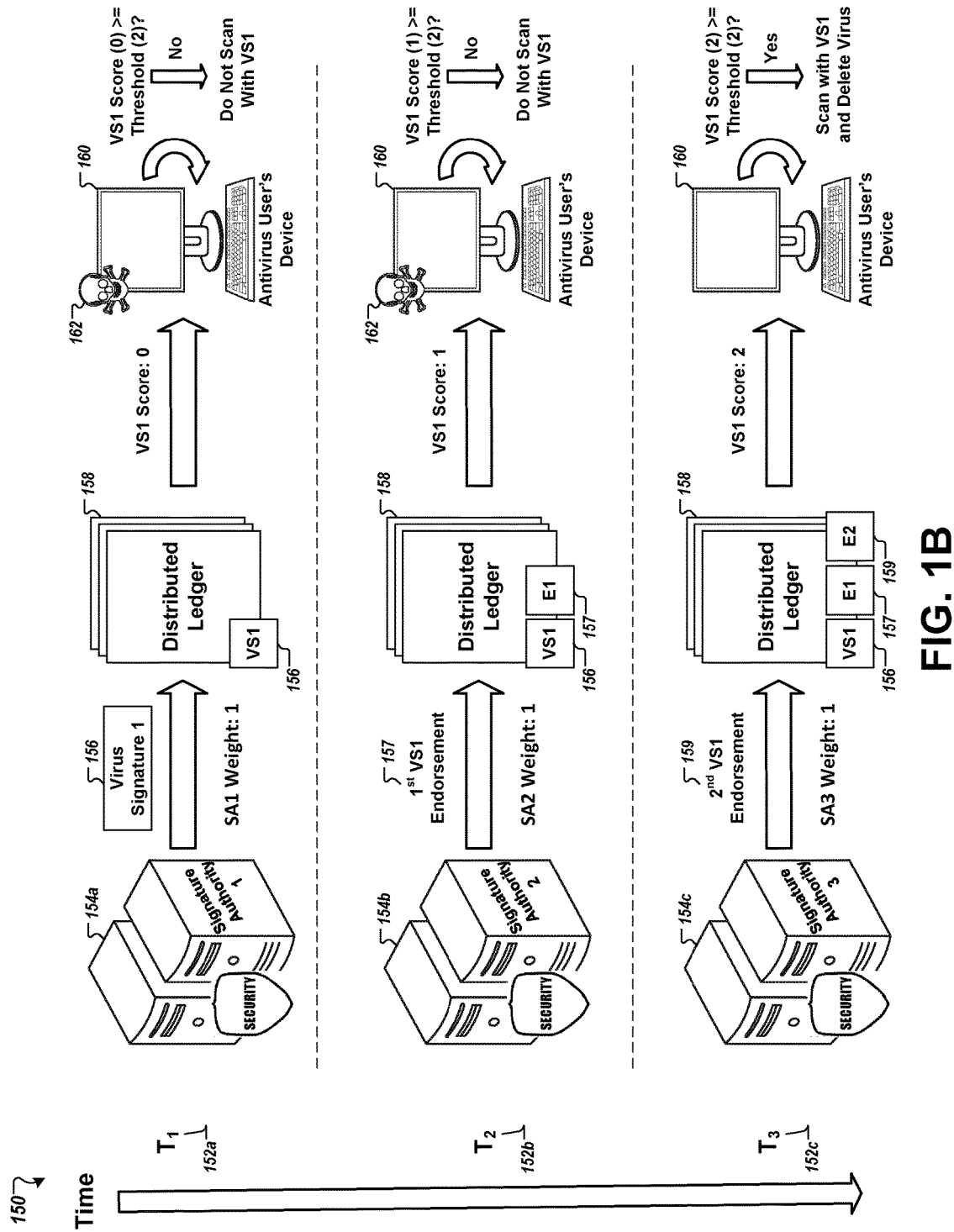
FIG. 1B is a conceptual diagram of an example process for distributing a new virus signature to user devices via a distributed ledger. The time at which the new signature is released for use by the user devices can be determined based on a number of endorsements made of the signature by various authorities on the ledger.

FIG. 1B is a conceptual diagram of a process 150 that is a variation of the process 100 represented in FIG. 1A. Whereas the virus signature score represented in FIG. 1A was primarily a function of the number of the signature authorities that submitted a given virus signature (as well as the trust values associated with the signature authorities), the virus signature score represented in FIG. 1B is determined based on the number of signature authorities that have endorsed a virus signature. For example, after a first signature authority 154a has made an initial submission of a virus signature 156 to the ledger 158, other signature authorities can then retrieve the virus signature 156 from the ledger 158, test the signature 156 to verify its safety and efficacy, and then make a determination about whether to endorse the signature 156. If a sufficient number of signature authorities endorse the signature 156 (taking the respective trust values of the signature authorities into account), the score for the signature 156 will exceed a pre-defined threshold so that the signature 156 can be employed in virus scans on the user device 110.

In particular, three stages of the process 150 are represented in FIG. 1B, respectively occurring during periods of time $T_1$-$T_3$ (152a-c). During the first period of time $T_1$ (152a), the first signature authority 154a initially submits a virus signature 156 for distribution via the distributed ledger 158. Other signature authorities may periodically check the distributed ledger 158 for any newly submitted virus signatures, and may identify the virus signature 156. The other signature authorities may then evaluate the signature 156 authority to determine how effective it is at detecting the virus(es) that are targeted by the signature 156. For example, the signature authorities may determine through a series of tests a false positive rate (rate of benign files wrongly identified as a targeted virus) and a false negative rate (rate of viruses missed by the signature 156) associated with the signature 156. If these and/or other metrics related to the efficacy and safety of the signature 156 fall within acceptable levels, then the other signature authorities may offer an endorsement of the signature 156 on the distributed ledger 158.

The score associated with the signature 156, which may be used by the user device 160 to determine whether to incorporate the signature 156 into virus scans by the device 160, may be based in whole or in part on endorsements of the signature 156. In the example depicted in FIG. 1B, immediately after the first signature authority 154a has submitted the virus signature 156, the signature 156 has no endorsements by other signature authorities. As such, the signature score is below the threshold score (here, the threshold has been adjusted to 2), and the user device 160 does not use the signature 156 to scan files for viruses or other forms of malware. At time T2 (152b), a second signature authority 154b posts an endorsement 157 of the virus signature 156 to the distributed ledger 158. The score that results from this first endorsement does not satisfy the threshold score, however, and so the user device 160 continues to wait for the score to increase. Then at time $T_3$ (152c), a third signature authority 154c posts a second endorsement 159 of the signature 156 to the ledger 158. As a result of the second endorsement, the score for the signature 156 rises to the threshold score such that the user device 160 is now enabled to use the signature 156 in running scans. The signature 156 may be used to detect and eliminate the virus 162 from the user's device 160, for example.

As occurred in the process 100 (FIG. 1A), in the process 150 of FIG. 1B, signature authorities may be assigned trust values that indicate a weight that the authorities' respective actions with respect to a given virus signature will be afforded in impacting the score associated with the given signature. In FIG. 1B, each of the signature authorities 154a-c has the same trust value of 1 so that each authorities' action is given equal weight. When the second signature authority 154b endorses the signature 156, the signature score increases from 0 to 1, and when the third signature authority 154c endorses the signature 156, the signature score increases from 1 to 2. Of course, in some implementations, the various signature authorities may be assigned different trust values. Moreover, the trust values need not be static, but may change over time based, for example, on how reliable the authorities' previous virus signature submissions and endorsements have proven to be. Additionally, the scores associated with a virus signature need not be based on a single factor (e.g., number of submissions or number of endorsements), but rather may be based on a combination of multiple factors in some implementations. For example, the score may be based on both the number of times a signature has been submitted and endorsed on the ledger 158, and may optionally be based on one or more additional factors.

Figure 2:
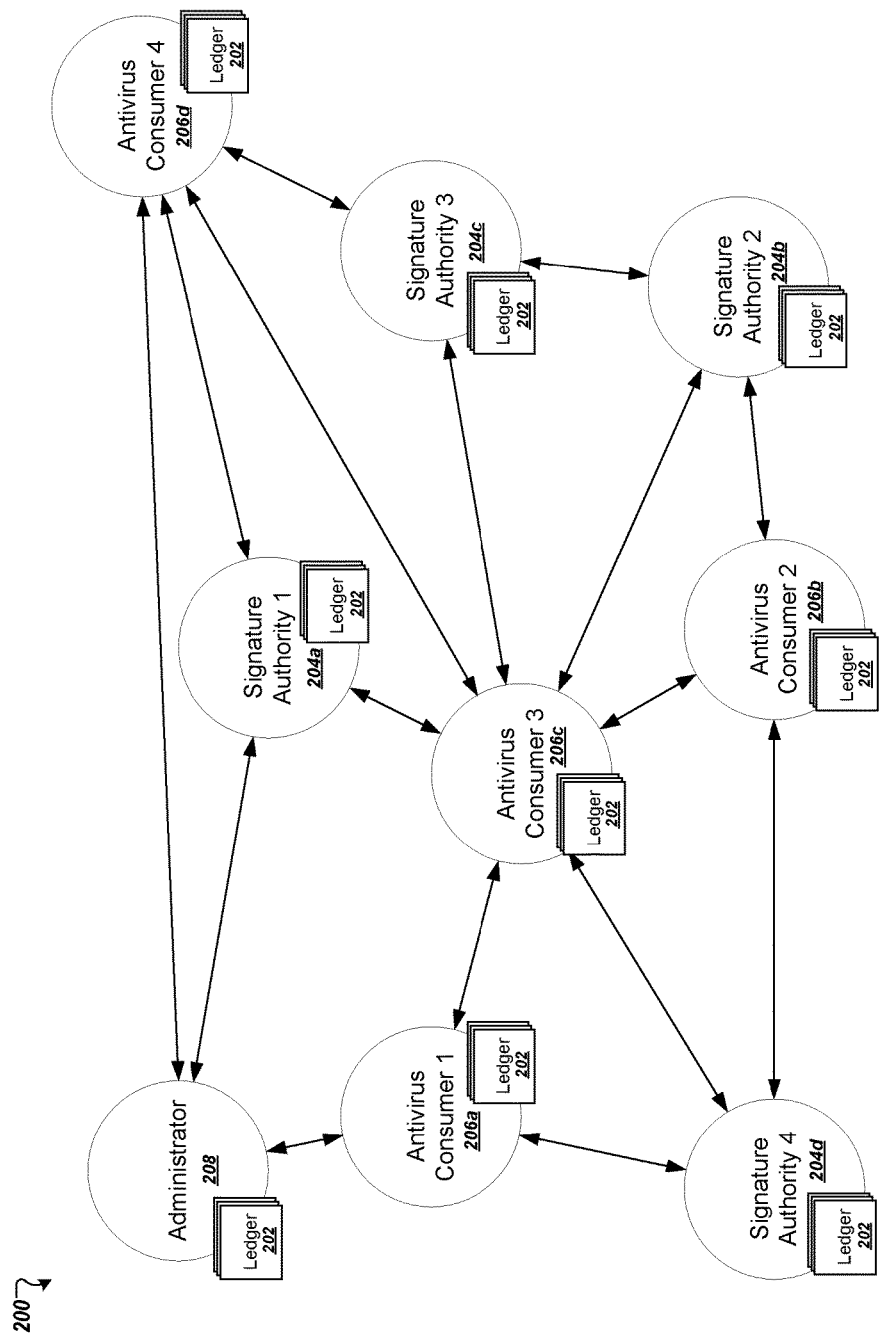
FIG. 2 is a diagram of an example computing network that is configured to facilitate, in some implementations, efficient and reliable distribution and validation of new virus signatures or other updates to antivirus engines on user devices.

FIG. 2 is a diagram of an example computer network 200 that is designed, in some implementations, to facilitate efficient and reliable distribution and validation of new virus signatures and other updates to antivirus engines on user devices. The network 200 may be public or private, in that participation in the network may or may not be restricted (e.g., an open Internet-based network vs. an enterprise network). Generally, the network 200 is organized in a decentralized (distributed) manner. For example, the nodes in the network may communicate with each other directly without a centralized intermediary. Rather, the ledger database 202 may be fully replicated and independently maintained at many different nodes of the network 200. In some implementations, the ledger database 202 at each of the nodes itself may act as a virus definition file for an antivirus engine. As such, when the antivirus engine performs a scan, it may directly access the ledger database 202 and scan files based on the valid signatures contained in the ledger.

The network 200 includes a plurality of nodes, where each node is linked to and capable of communicating with at least one other node in the network 200. Each of the nodes may assume a particular role in the network 200. For example, a first set of nodes 204a-d represent computers respectively associated with a plurality of signature authorities that have agreed to participate in the network. A second set of nodes 206a-d represent computers respectively associated with a set of the consumer devices (e.g., user devices on which antivirus software is installed and uses signatures from the ledger 202 to affect scans on the devices). In some implementations, the network may also have one or more administrators 208, which may be certain nodes in the network that have been assigned rights to perform tasks such as changing or assigning trust values to signature authorities, changing endorsement requirements, or otherwise maintaining the network. The administrator 208 can grant, modify, and revoke privileges to others on the network 200. For example, the administrator may assign rights to certain trusted parties to act as signature authorities on the network 200. In this capacity, the signature authorities may be allowed to submit new signatures to the ledger 202, endorse signatures submitted by others on the ledger 202, or both. Consumers, in contrast, may be capable of accessing and browsing the ledger 202 but in a read-only capacity (e.g., without the ability to submit or endorse new virus signatures). In some implementations, consumers 202 may nevertheless be able to post certain types of transactions to the ledger 202, such as data indicating the user's comments, ratings, and/or reviews of a signature authority or a given signature. Consumer devices (user devices) may be, for example, a desktop computer, a notebook computer, a smartphone, tablet, or other mobile device, or a wearable computing device, for example.

In some examples, the distributed ledgers described herein may be implemented as a blockchain database. A blockchain database is generally a database that is shared among a plurality of nodes constituting a network, wherein each node can directly access (e.g., read or write) the database. The blockchain database may be distributed among the nodes rather than being administered by a single entity. Each node in the network may manage its respective copy of the ledger independently, but in effect the ledger may be identically replicated across the network because changes to the ledger may be made in a coordinated manner across the network.

In some implementations, the blockchain database may be transparent, in that transactions (e.g., events related to the distribution and use of 3D model files over the network) may be permanently recorded and incapable of deletion or revision without leaving a trace.

When a node "sends a transaction" to a blockchain database, it may access the database in accordance with an action specified in the transaction, e.g. it may write data and/or run a program stored in the blockchain.

Transactions recorded in a blockchain database can be grouped into "blocks," which are, after validation via a consensus algorithm, chained together over time to form a "blockchain." The blocks are said to form a "chain" because each block may contain a reference to the previous block. For example, each block may include a timestamp that identifies when a previous block has been added to the chain. In some implementations, every block in the chain may contain a hash of the previous block in the chain. This has the effect of creating a chain of blocks from the genesis block to the current block. Each block is guaranteed to come after the previous block chronologically because the previous block's hash would otherwise not be known. Each block may also be computationally impractical to modify once it has been in the chain for a while because every block after it would also have to be regenerated. Honest generators may only build onto a block (by referencing it in blocks they create) if it is the latest block in a longest valid chain.

In some implementations, nodes in the computing network that maintain the distributed ledger can validate a block of transactions that is to be added to the blockchain by reaching at least a threshold consensus among the nodes that (i) a digital signature associated with the block is valid and (ii) the block (or transactions within the block) comply with one or more additional validation rules. Each computing node in the network (or a subset of the nodes that are tasked with maintaining the distributed ledger) can independently validate a block of transactions. If at least a threshold number of these nodes (e.g., 50, 60, 75, or 100 percent of the nodes) validate the block, then the block can be added to the blockchain. If the threshold consensus is not reached, the block may not be added to the blockchain. This can ensure that no individual node acts dishonestly to alter the ledger in an illegitimate manner.

In some implementations, each node in the network may be associated with an identifier and be provided with a cryptographic private key—public key pair. All the nodes in the network may have a list of the public keys and the respective identifiers of the other nodes. In some implementations, the identifier for a node may be its public key such that transactions involving a given node are addressed using the node's public key.

When a node sends a transaction (e.g., any record to be recorded) to the blockchain database, the node can sign the transaction with its private key. The transaction may then be broadcast to the other nodes, wherein each communication from a node uses the node's identifier. The other nodes can then use the public key associated with the identifier to verify the digital signature so as to authenticate the source of the communication and confirm that the communication has not been tampered with. The other nodes may also check that the transaction complies with any additional rules required to validate a transaction or block of transactions, such as by the use of smart contracts. Once the validity of a block has been ascertained, the other nodes may indicate its validity by signing the block themselves with their private keys, so that the block can be deployed to the blockchain. The consensus process may be carried out by all nodes or only by a pre-selected set of nodes. This means that it may be necessary for all the nodes to sign the block, or only for a part of them, in order to validate a block.

In some implementations, the distributed ledger may employ a permissioned blockchain. A permissioned blockchain database is a blockchain database in which transaction processing is performed by nodes associated with known identities. In other words, the identity of the users of the nodes may be whitelisted (or blacklisted), e.g. through some type of know-your-business (KYB) or know-your-client (KYC) procedure. Similarly, the blockchain database may be private, meaning that access to the blockchain database data may be limited, e.g. only to certain signature authorities or end user devices.

In some implementations, the ledger (e.g., blockchain database) may not only store transactional records, but also files comprising a combination of data and executable computer programs. To this end, the blockchain database may be provided, for example, with a Turing-complete programming language. In some implementations, a permissioned blockchain can enable the stipulation of trusted agreements between different nodes in the network, since at least pseudonyms of the users are known. The conditions of these agreements may be stored in the blockchain database and, since they reside in the blockchain database, the conditions are transparent, i.e. they cannot be covertly modified by one of the parties. In some implementations, programs that, when executed, automatically cause performance of one or more aspects of an agreement. These programs are sometimes referred to as "smart contracts." For example, in some implementations, a smart contract may be employed that "locks" a virus signature stored in the blockchain from being provided to or executed by end user devices until at least a threshold number of signature authorities have submitted or endorsed the signature, or until a score based on such factors meets a threshold score.

In some implementations, programs stored on the blockchain may include a set of functions reachable through the address at which the program file resides in the blockchain. By accessing the program via its address, one or more functions may be executed. The program is stored in the blockchain database but is executed locally by the nodes. The functions may require input to run; when a node sends the transaction that calls a function, it may also provide the necessary input data. In some implementations, the blockchain database may be not only permissioned, but also include rights management for the functions in the programs, in that only a subset of the nodes (whitelisted nodes) may be allowed to call specific functions.

Figure 3:
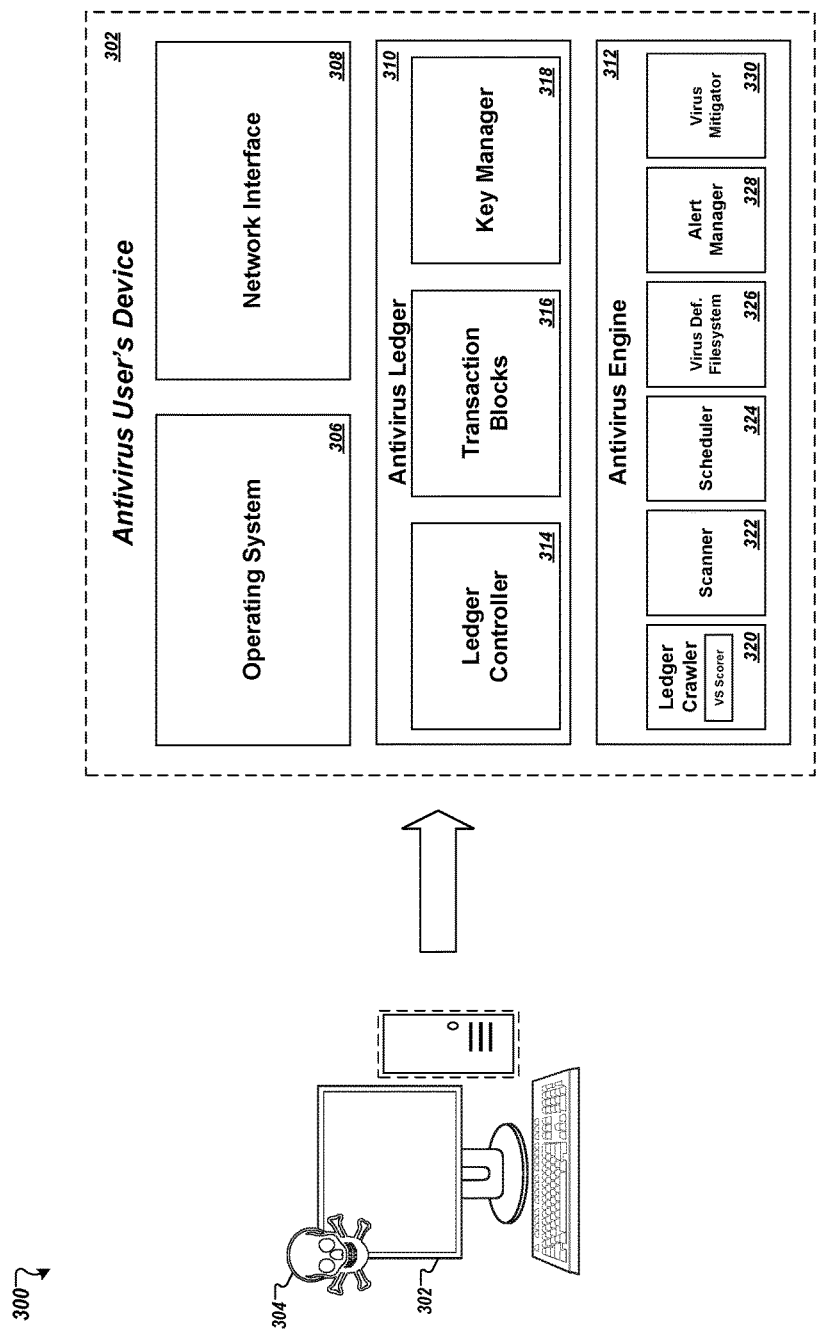
FIG. 3 is a block diagram of an example user's computing device that includes an antivirus engine. The antivirus engine is configured to participate in a network for distributing antivirus updates through a distributed ledger.

FIG. 3 is a block diagram 300 of an example user's computing device 302 that includes an antivirus engine 312 that uses a distributed ledger 310 to efficiently and safely update virus definitions on the device used for scanning files for the presence of malware. The user's device 302 may, in some implementations, be applied as any of the user's devices described herein, including consumer devices 206a-d, user's device 110, and others. In some implementations, the user's device 302 may be a desktop computer, a notebook computer, a mobile computing device (e.g., a smartphone or tablet), or a wearable computing device. The device 302 has been infected by one or more viruses 304, which may be detected and remedied by an antivirus engine 312 installed on the device 302. Generally, the user's device 302 can further include an operating system 306, a network interface 308, an antivirus ledger 310, and an antivirus engine 312. The network interface 308 may enable the device 302 to communicate over one or more networks (e.g., the Internet) with other nodes in a network that maintains the ledger 310, for example.

The antivirus ledger 310 is a database or other data structure that stores information about antivirus signatures made available to consumer devices (e.g., the user's device 302) by a network of signature authorities. In some implementations, the ledger 310 may be a blockchain database. A full or partial copy of the ledger may be stored on the user's device 310. The full ledger 310 may contain a generally chronologically ordered record of every transaction posted to the ledger 310 since the ledger's 310 genesis. The transactions may include, for example, submissions of new virus signatures by signature authorities, endorsements of signatures by signature authorities, downloads and uses of signatures by consumer devices, ratings and other feedback of signatures by consumer devices, and more. The transactions may be grouped into blocks and linked to each other in chronologically ordered blockchain 316. A ledger controller 314 may coordinate and manage actions associated with the ledger 310, including processing received transactions from other nodes in a distributed network that maintains the ledger 310, broadcasting transactions to the other nodes in the network, and communicating with the antivirus engine 312 to provide necessary information from the ledger 310 to the antivirus engine 312 (e.g., notices of new signatures posted to the ledger 310, endorsements, etc.). The ledger may further include a key manager 318. The blockchain relies heavily on various cryptographic techniques, and so the key manager may securely store, maintain, and generate keys that can be used to carry out these tasks.

The antivirus engine 312 is generally operable to detect various forms of malware on the user's device 312 and to take action to protect the device 312 from malware. In some implementations, the antivirus engine 312 may be an integral part of the device's operating system 306. In some implementations, the antivirus engine 312 may be an installed application developed by a third party separate from a developer or manufacturer of the device 302 or operating system 306. The antivirus engine 312 may include a ledger crawler 320, a scanner 322, a scheduler 324, a virus definition filesystem 326, an alert manager 328, and a virus mitigator 330. The ledger crawler 320 is configured to the continuously or periodically crawl the antivirus ledger 310 to identify updates related to previously identified or new virus signatures. The crawler 320 may include a scoring module that calculates a score for signatures stored in the ledger 310 based on factors such as the number of submissions of the signature to the database by different signature authorities, endorsements of signatures stored in the ledger 310, and trust values associated with the submitting or endorsing authorities. The trust values may be statically assigned, or they may be dynamic and change over times based on the history, reliability, and/or frequency of a given signature authority's submissions and/or endorsements over time. A signature authority that has proven over time that signatures it submits or endorses on the ledger 310 are safe and effective may be assigned a higher trust value, whereas a signature authority that has been less reliable may be assigned a lower trust value.

The scanner 322 is designed to scan applications, documents, and other types of files on the device 322. The scanner may run in the background and perform periodically scheduled scans of files to identify and mitigate malware on the device 322. In some implementations, the scanner may also perform on-click scanning of files that are about to be executed on the device to ensure that the file is safe before it is opened. The scanner may also perform heuristic testing during execution of an application or other files to determine runtime characteristics that may match a runtime signature of known malware. The scheduler 324 may schedule when scans are to take place (e.g., daily, weekly). Virus signatures used by the scanner 322 may be stored in a virus definition filesystem 326. In some implementations, the new signatures that have been validated for use may be copied from the ledger 310 into the filesystem 326 for use by the scanner 322. In some implementations, the filesystem 326 may be implemented directly in the ledger 310. In other words, rather than copying trusted signatures from the ledger 310 to a separate filesystem 326, the scanner 322 may directly access signatures from the ledger 310 that have been determined to be safe and effective for use on the device 302. The alert manager 328 may present audible and visual alerts to a user of the device 302, for example, that indicate when new malware has been detected and when action has been taken to mitigate the malware. The virus mitigator 330 can mitigate malware detected by the scanner 322 to remove the threat posed by the malware. In some implementations, the mitigator 330 may quarantine files on the device 302 in an area that prevents the files from being executed. In some implementations, the mitigator 330 may delete files that are determined to include malware automatically upon their detection.

Figure 4:
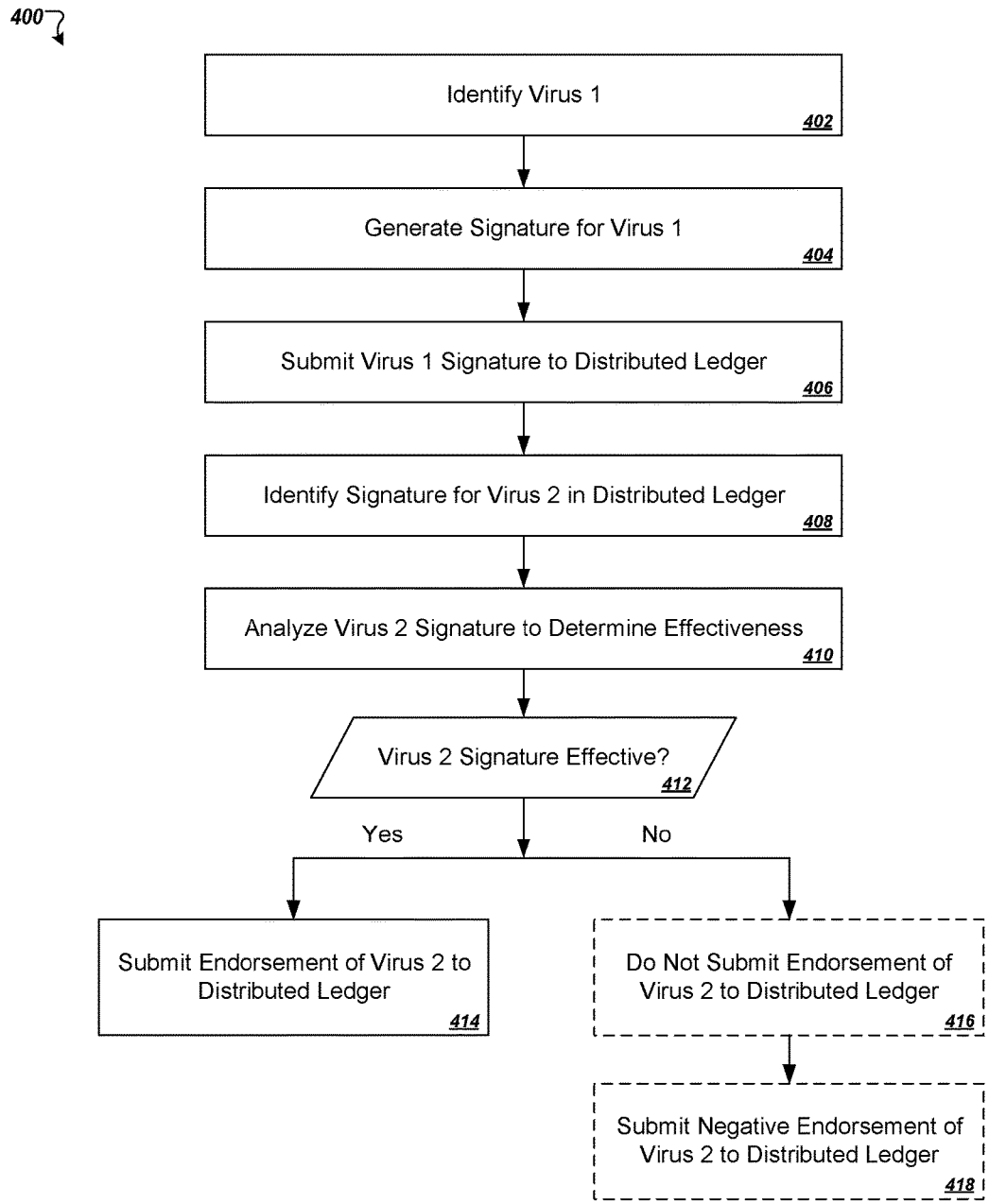
FIG. 4 is a flowchart of an example process by which a signature authority may generate, submit, and endorse virus signatures to a distributed ledger.

Referring to FIG. 4, a flowchart is depicted of an example process 400 by which a signature authority may generate, submit, and endorse virus signatures to a distributed ledger. In some implementations, the process 400 may be carried out by computing devices and systems associated with signature authorities as described throughout this document, including the signature authorities represented in FIGS. 1A, 1B, and 2. Additionally, this discussion of the process 400 is described in terms of signatures being submitted to and distributed to consumers through a distributed ledger (e.g., a blockchain database). However, other distribution mechanisms are also possible in some implementations. For example, a more centralized architecture could be employed for a cloud-based antivirus updating service. In the cloud-based service, the participants in the service (e.g., signature authorities and consumers) may all communicate with server(s) associated with a distribution service. The signature authorities may upload or otherwise submit new virus signatures to the central servers, and the distribution service may alert other signature authorities that a new virus signature is available. The other authorities may then evaluate the new signature and determine whether to endorse the signature. If a sufficient number of endorsements are received, for example (and/or if a sufficient number of submissions of the signature are made), the signature may be released to consumers.

The process 400 can begin at stage 402, where a signature authority identifies a first virus. The virus may generally be any form of malware that exploit consumers' computing devices for illegitimate ends, such as actual viruses, trojans, worms, and the like. The virus may be identified in various ways. For example, the signature authority may receive reports from user devices that indicate problems or unusual behavior at the computing devices. The reports may be aggregated and analyzed to isolate particular programs or other code on the devices that caused the problems or unusual behavior. If the identified code is likely unauthorized and unwanted by the consumers, the code may be classified as malware, and the signature authority may begin work to determine a signature for the virus.

At stage 404, the signature authority develops a signature for the first virus. The signature can include a series of computer symbols (e.g., numbers, characters, bits, ordered bytes) that are usable by an antivirus engine to identify the first virus on a consumer's device. The signature is thus usable for detection of viruses on computer devices. A virus signature can generally have the property that it uniquely corresponds to one or more different computer viruses such that the computer viruses can be detected using the signature, which is like a fingerprint for the viruses. For example, a virus signature may include one or more hashes or program code that implements an algorithm for identifying the viruses. In this way, an antivirus engine on a computing device may hash files stored by the device and compare the hash to virus signatures indicated by virus definition files on the device. When a match is determined between a given file on a computing device and data indicated by a virus signature, the file may be flagged as being malware and appropriate remedial action taken (e.g., quarantining or deleting the file). In some cases, the signature for a virus may be unique such that even if multiple independent signature authorities develop a signature for a same virus, the signatures will all be identical or substantially identical.

At stage 406, the signature authority submits the signature for the first virus to the distributed ledger. By submitting the signature, the signature authority may expressly or impliedly certify to other stakeholders that the submitted signature is believed to be effective at detecting particular code on a computing device and that the particular code is believed to be malicious (i.e., that the signature targets a virus). In some implementations, such as where the distributed ledger is a blockchain database, the signature authority may submit the signature to the ledger by broadcasting a new transaction through the network of computer nodes that maintains the ledger. The transaction may identify the source of the new signature, the fact that a new signature is available, and may also store the signature itself or at least point to a location where the signature is stored and can be accessed. The transaction can be propagated among the nodes, and each node may verify the authenticity of the transaction. If it is validated, then the nodes may coordinate to add it to the blockchain. The signature for the first virus may then be tested by other signature authorities, for example, and released for use by consumer devices when a score associated with the signature reaches a threshold.

At stage 408, the first signature authority (i.e., the entity that identified the first virus and generated and submitted the signature for the first virus in stages 402-406) is alerted to the fact that another, second signature authority has made a signature for a second virus available in the distributed ledger. The first signature authority may identify the signature for the second virus by crawling the ledger for any new signatures that have been made available, may flag incoming transactions submitted by other signature authorities related to the second virus signature, or may be otherwise alerted to the fact from within the ledger or out-of-band.

At stage 410, in response to identifying the new signature for the second virus in the distributed ledger, the first signature authority's computing system can automatically begin performing a series of tests on the signature to benchmark its performance and determine if it is effective and safe for release to consumers. The testing may include, for example, independently generating a signature for the second virus and comparing the pair of independently signature to determine a match among the signatures. If the signatures match and they are determined to be effective and safe for consumers, then the first signature authority may endorse the signature for the second virus on the distributed ledger (stage 414). In some implementations the first signature authority may not attempt to independently generate the signature, but may instead evaluate the performance (effectiveness) of just the signature developed by the second signature authority. The testing may include determining a detection rate, a false positive detection rate, and/or a false negative detection rate with respect to the signature's ability to accurately detect targeted viruses without also inadvertently classifying benign files as malicious.

At stage 412, the first signature authority determines whether the signature is sufficiently effective to warrant release to consumers. For example, the testing and performance metrics determined at stage 410 may be compared to a set of benchmarked or threshold metrics. If the empirical metrics satisfy minimum performance requirements, then the process 400 proceeds to stage 414 and the first signature authority submits an endorsement of the second virus to the distributed ledger. However, if the empirical metrics do not satisfy minimum performance requirements, then the process 400 may proceed to stages 416 or 418. For example, at stage 416, the first signature authority may choose not to submit an endorsement of the signature for the second virus and therefore takes no action on the ledger. Alternatively, at stage 418, the first signature authority may submit a negative endorsement of the signature for the second virus to the distributed ledger. A negative endorsement may have the effect of lowering the signature's score on the ledger. For example, if the trust value assigned to the first signature authority were 1.3, then the first signature authority's endorsement of the second virus signature may add 1.3 points to the signature's pending score. Conversely, the first signature authority's negative endorsement of the second virus signature may subtract 1.3 points from the signature's pending score. In some implementations, different weights may be applied for different actions taken by a signature authority, such that a submission, positive endorsement, or negative endorsement by the same signature authority may increase or decrease a signature's score by different amounts.

Figure 5:
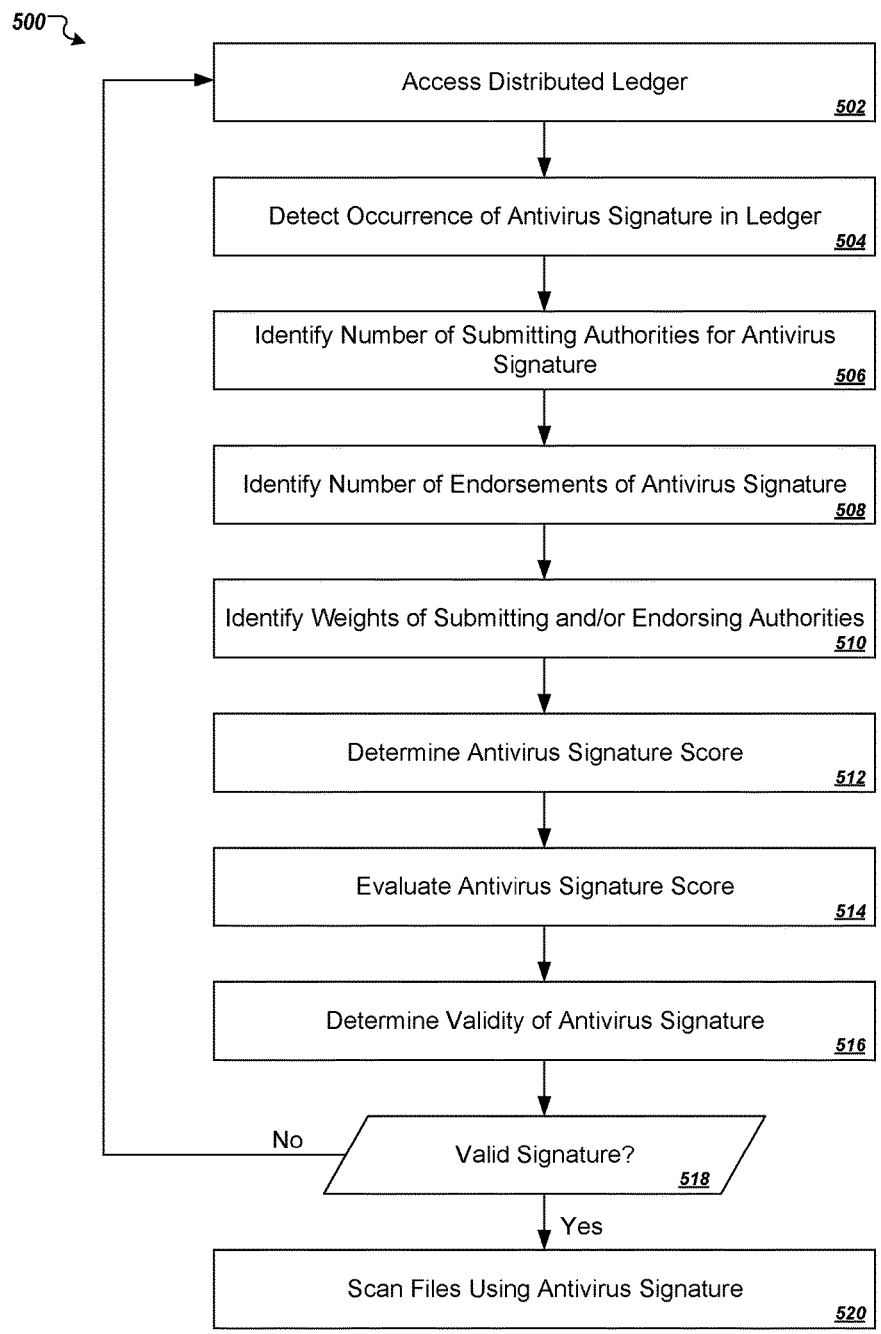
FIG. 5 is a flowchart of an example process for loading new virus signatures onto a user's device for use in antivirus scans with a distributed ledger.

FIG. 5 depicts a flowchart of an example process 500 for loading new virus signatures onto a user's device for use in antivirus scans using a distributed ledger. In some implementations, the process 500 may be carried out by the computing devices and systems of end users (e.g., consumers) described herein including with respect to FIGS. 1A, 1B, 2, and 3. Additionally, the process 500 uses a distributed ledger (e.g., a blockchain database) to distribute new signatures the in some implementations.

The process 500 can begin a stage 502, where the antivirus user's device accesses a distributed ledger or other database that has been configured to enable distribution of antivirus signatures issued by one or more the signature authorities. A copy of the distributed ledger may be stored in full or in part on the user's device, or the device may access a copy of the ledger from a computing system remote from user's device (e.g., over the Internet). In some implementations, the distributed ledger may include a blockchain database. Respective instances of the blockchain database may be maintained in a separate, but coordinated manner at each of a plurality of nodes in a computing network including at the user's device. As a participant in the blockchain network, the user's computing device may receive transactions (e.g., submissions of new virus signatures or endorsements of such signatures, and consumers' uses, reviews, and ratings of signatures distributed through the ledger), and may broadcast transactions of its own. The computing device may work on validating transactions, and ordering them into blocks in the blockchain.

At stage 504, the user's device detects that a new signature for a virus has been submitted to the ledger. The new signature may be capable of identifying a virus that has infected the user's device, but for which the user's device (and hence the user) has not yet detected. In some implementations, the user's device may continuously or periodically crawl the ledger to identify any new viruses that have been submitted and that are available on the ledger.

At stages 506 and 508, the user's device may analyze the ledger to determine metrics associated with the new virus signature that was identified at stage 504. The metrics may pertain to any factors that influence a score used by the user's device to determine whether the new virus signature is ready to be safely deployed for use on the device. For example, at stage 506, the device may identify each occurrence (submission) of the signature in the ledger, and may determine a count of the number of unique authorities that have submitted the signature. At stage 506, the device may identify a count of the number of endorsements (both positive and negative) that different signature authorities have made of the signature. The device may also identify trust values associated with each of the signature authorities that has submitted or endorsed the signature (stage 510). Using such data identified from the ledger at stages 506-510, the user's device may then calculate a score for the signature (stage 512). In some implementations, the score may be calculated by taking the sum of points assigned to each identified action (e.g., submission or endorsement) weighted by the trust value of the respective signature authority that performed the respective action.

In some implementations, the score may be individually determined by each consumer node (e.g., user's device) in the computing network based on raw transaction data recorded in the distributed ledger (e.g., number of submissions or endorsements identified in a chain of transactions related to a same signature). Thus, the score is not explicitly stored on the ledger itself, but is instead derived from data contained in the ledger by the user's device. This can allow individual consumers to independently verify the score without relying on another authority to tell the consumers what the score should be. Additionally, this approach may afford individual consumers greater flexibility in computing scores. For example, different consumers may apply different formulations to calculate a score. A first consumer may count only a number of unique submissions of a signature to the ledger in determining his or her score, whereas a second consumer may count both the number of submissions and endorsements of the signature. The trust values or other weights applied in the score formulations may also be adjusted or set by individual consumers, thereby providing flexibility for consumers to personalize the set of authorities that are most and least trusted. In some implementations, the score may be stored directly on the ledger and obtained by individual consumers from the ledger without an opportunity to personalize how the score is formulated.

At stage 514 and 516, the user's device evaluates the signature score determined at stage 512 and determines the validity of the signature based on the score. If the signature is valid, the user's device proceeds from stage 518 and incorporates the signature into the set of signatures used by the device for antivirus scans (stage 520). If the signature is not yet valid, then the process 500 may return from stage 518 to stage 502 and may continue to check the distributed ledger until further submissions, endorsements, or other feedback on the signature is sufficient to raise the signature's score to a valid level. In some implementations, the user's device may evaluate the signature score by comparing the score to a threshold score. If the signature's score satisfies the threshold (e.g., is greater than or equal to the threshold), then the signature may be deemed valid. If the signature's score does not satisfy the threshold, then the signature may be deemed invalid.

In some implementations, the threshold may be adjustable and selectable by individual users at user devices. For example, for a more aggressive approach where a user is looking to try new signatures that have not been as thoroughly vetted, the user may set a lower threshold. For more conservative approaches that ensure any signatures used by the device are more thoroughly vetted, the user may set a higher threshold. In some implementations, the threshold may be automatically selected by an antivirus engine on the user's device based on context, such as a risk profile determined by the device.

Figure 6:
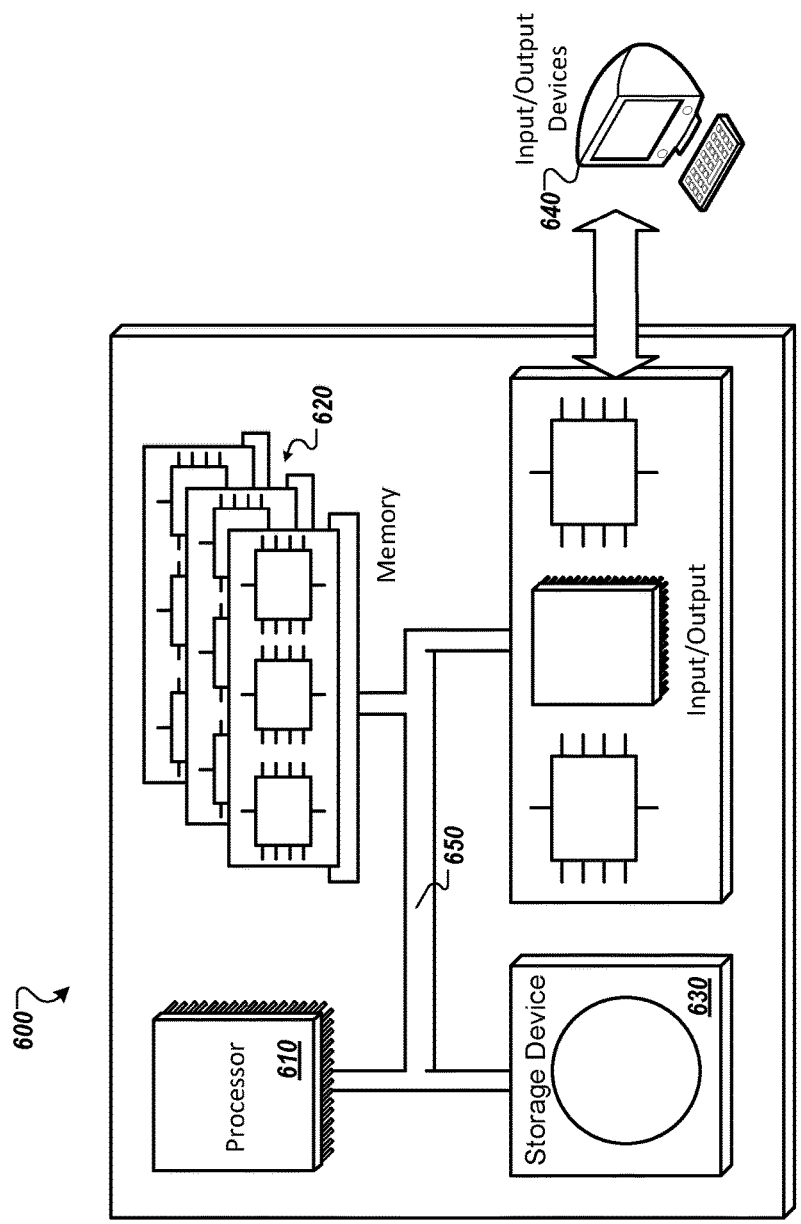
FIG. 6 depicts a schematic diagram of an example computer system that can be used to perform the operations associated with the computer-implemented methods and other techniques described herein.

FIG. 6 is a schematic diagram of a computer system 600. The system 600 can be used to carry out the operations described in association with any of the computer-implemented methods described previously, according to one implementation. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 400. In one implementation, the storage device 630 is a computer-readable medium. In various different implementations, the storage device 630 may be a floppy disk device, a hard disk device, an optical disk device, or a tape device.

The input/output device 640 provides input/output operations for the system 400. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    accessing, by a computing system, an electronic ledger that stores records of a plurality of virus signatures submitted for distribution by a plurality of signature authorities, wherein respective instances of the electronic ledger are separately maintained by each of a plurality of nodes in a computing network;
    identifying a signature score associated with a first virus signature among the plurality of virus signatures, wherein the signature score represents a level of trust for the first virus signature and is determined based on at least one of a number of signature authorities that have submitted the first virus signature for distribution on the electronic ledger or a number of signature authorities that have endorsed the first virus signature on the electronic ledger;
    determining whether the first virus signature is valid based on whether the signature score satisfies a threshold validity score; and
    in response to determining that the first virus signature is valid, using the first virus signature in virus scans of files maintained by the computing system,
    wherein the computing system is configured to not use the first virus signature in virus scans of files maintained by the computing system until the signature score associated with the first virus signature is determined to satisfy the threshold validity score.

2. The computer-implemented method of claim 1, wherein the electronic ledger comprises a blockchain.

3. The computer-implemented method of claim 1, wherein:
    a first instance of the electronic ledger is stored and maintained by the computing system;
    other instances of the electronic ledger are respectively stored and maintained by other computing systems that comprise nodes in the computing network; and
    the method further comprises:
        receiving, at the computing system, transactions broadcasted over the computing network by at least some of the other computing systems, the transactions indicating at least one of new virus signatures that are submitted for distribution on the computing network or votes by signature authorities to endorse existing virus signatures that have been submitted for distribution on the computing network; and
        adding records of the received transactions to the first instance of the electronic ledger.

4. The computer-implemented method of claim 3, comprising:
    verifying the identity of a particular computing system, among the at least some of the other computing systems, that broadcasted a particular one of the transactions; and
    adding a record of the particular one of the transactions to the first instance of the electronic ledger in response to verifying the identity of the particular computing system.

5. The computer-implemented method of claim 1, wherein:
    a first subset of the plurality of nodes in the computing network that respectively correspond to different ones of a plurality of signature authorities are assigned at least one of (i) permission to submit new virus signatures for distribution over the computing network by posting new signature transactions to the electronic ledger or (ii) permission to post voting transactions to the electronic ledger that indicate the validity of existing virus signatures that have been made available for distribution over the computing network; and
    a second subset of the plurality of nodes in the computing network that respectively correspond to different ones of a plurality of consumer computing systems are blocked from submitting new virus signatures for distribution over the computing network or posting voting transactions to the electronic ledger.

6. The computer-implemented method of claim 1, wherein determining whether the first virus signature is valid comprises determining, based on the signature score, whether at least a threshold number of signature authorities have submitted the first virus signature for distribution on the electronic ledger or whether at least a threshold number of signature authorities have endorsed the first virus signature on the electronic ledger.

7. The computer-implemented method of claim 1, wherein:
    each of the plurality of signature authorities is assigned a respective weighting value; and
    the signature score is determined further based on the respective weighting values assigned to signature authorities among the plurality of signature authorities that have submitted or endorsed the first virus signature on the electronic ledger, such that the submission or endorsement of the first virus signature by signature authorities that are assigned different respective weighting values causes adjustments to the signature score by different amounts.

8. The computer-implemented method of claim 7, further comprising receiving, at the computing system, user input to change a first weighting value assigned to a first signature authority among the plurality of signature authorities, and in response, changing the first weighting value based on the user input.

9. The computer-implemented method of claim 1, wherein the signature score indicates a number of signature authorities that have endorsed the first virus signature on the electronic ledger.

10. One or more non-transitory computer-readable media having instructions stored thereon that, when executed by one or more processors, cause performance of operations comprising:

accessing, by a computing system, an electronic ledger that stores records of a plurality of virus signatures submitted for distribution by a plurality of signature authorities, wherein respective instances of the electronic ledger are separately maintained by each of a plurality of nodes in a computing network;

identifying a signature score associated with a first virus signature among the plurality of virus signatures, wherein the signature score represents a level of trust for the first virus signature and is determined based on at least one of a number of signature authorities that have submitted the first virus signature for distribution on the electronic ledger or a number of signature authorities that have endorsed the first virus signature on the electronic ledger;

determining whether the first virus signature is valid based on whether the signature score satisfies a threshold validity score; and in response to determining that the first virus signature is valid, using the first virus signature in virus scans of files maintained by the computing system, wherein the computing system is configured to not use the first virus signature in virus scans of files maintained by the computing system until the signature score associated with the first virus signature is determined to satisfy the threshold validity score.

11. The one or more non-transitory computer-readable media of claim 10, wherein the electronic ledger comprises a blockchain.

12. The one or more non-transitory computer-readable media of claim 10, wherein:

a first instance of the electronic ledger is stored and maintained by the computing system;

other instances of the electronic ledger are respectively stored and maintained by other computing systems that comprise nodes in the computing network; and the operations further comprise:

receiving, at the computing system, transactions broadcasted over the computing network by at least some of the other computing systems, the transactions indicating at least one of new virus signatures that are submitted for distribution on the computing network or votes by signature authorities to endorse existing virus signatures that have been submitted for distribution on the computing network; and adding records of the received transactions to the first instance of the electronic ledger.

13. The one or more non-transitory computer-readable media of claim 12, wherein the operations comprise:

verifying the identity of a particular computing system, among the at least some of the other computing systems, that broadcasted a particular one of the transactions; and adding a record of the particular one of the transactions to the first instance of the electronic ledger in response to verifying the identity of the particular computing system.

14. The one or more non-transitory computer-readable media of claim 10, wherein:

a first subset of the plurality of nodes in the computing network that respectively correspond to different ones of a plurality of signature authorities are assigned at least one of (i) permission to submit new virus signatures for distribution over the computing network by posting new signature transactions to the electronic ledger or (ii) permission to post voting transactions to the electronic ledger that indicate the validity of existing virus signatures that have been made available for distribution over the computing network; and a second subset of the plurality of nodes in the computing network that respectively correspond to different ones of a plurality of consumer computing systems are blocked from submitting new virus signatures for distribution over the computing network or posting voting transactions to the electronic ledger.

* * * * *